US006978740B1

(12) United States Patent
Schlesser et al.

(10) Patent No.: US 6,978,740 B1
(45) Date of Patent: Dec. 27, 2005

(54) CROP RE-HYDRATION SYSTEM UTILIZING A DIRECT-FIRED STEAM GENERATOR HAVING CONTINUOUS WATER CIRCULATION

(75) Inventors: Walter Mark Schlesser, Ottumwa, IA (US); Eric Ryan Lang, Donnellson, IA (US); Timothy James Kraus, Hedrick, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/104,107

(22) Filed: Apr. 12, 2005

(51) Int. Cl.[7] .......... F22D 1/28
(52) U.S. Cl. .......... 122/406.3; 122/36; 122/415
(58) Field of Search .......... 122/406.3, 36, 122/414, 415, DIG. 10, 406.1, 27

(56) References Cited

U.S. PATENT DOCUMENTS 3,786,798 A * 1/1974 Huettner .......... 126/359.1
4,462,342 A * 7/1984 Welden .......... 122/448.1
5,043,175 A * 8/1991 Bayley et al. .......... 426/318
6,401,669 B1 * 6/2002 Macgowan et al. .......... 122/448.1

* cited by examiner

*Primary Examiner*—Gregory Wilson

(57) ABSTRACT

A direct-fired steam generator system is used in conjunction with a baler for providing steam for re-hydrating the crop being baled. Cooling water is pumped through water jackets defined by double walls surrounding the combustion chamber and adjacent components, with this water being routed exteriorly of the water jackets and back to a three-way water control valve provided for normally routing the water back to the cooling water reservoir. The control valve is selectively actuated to couple the returning water to an injector flange for metering the water into an outlet end of the combustion chamber only when a flame is present or soon to be present in the combustion chamber, whereby the water will come into contact with hot combustion gases and be changed to steam which is routed on to be applied to the crop being baled.

3 Claims, 1 Drawing Sheet

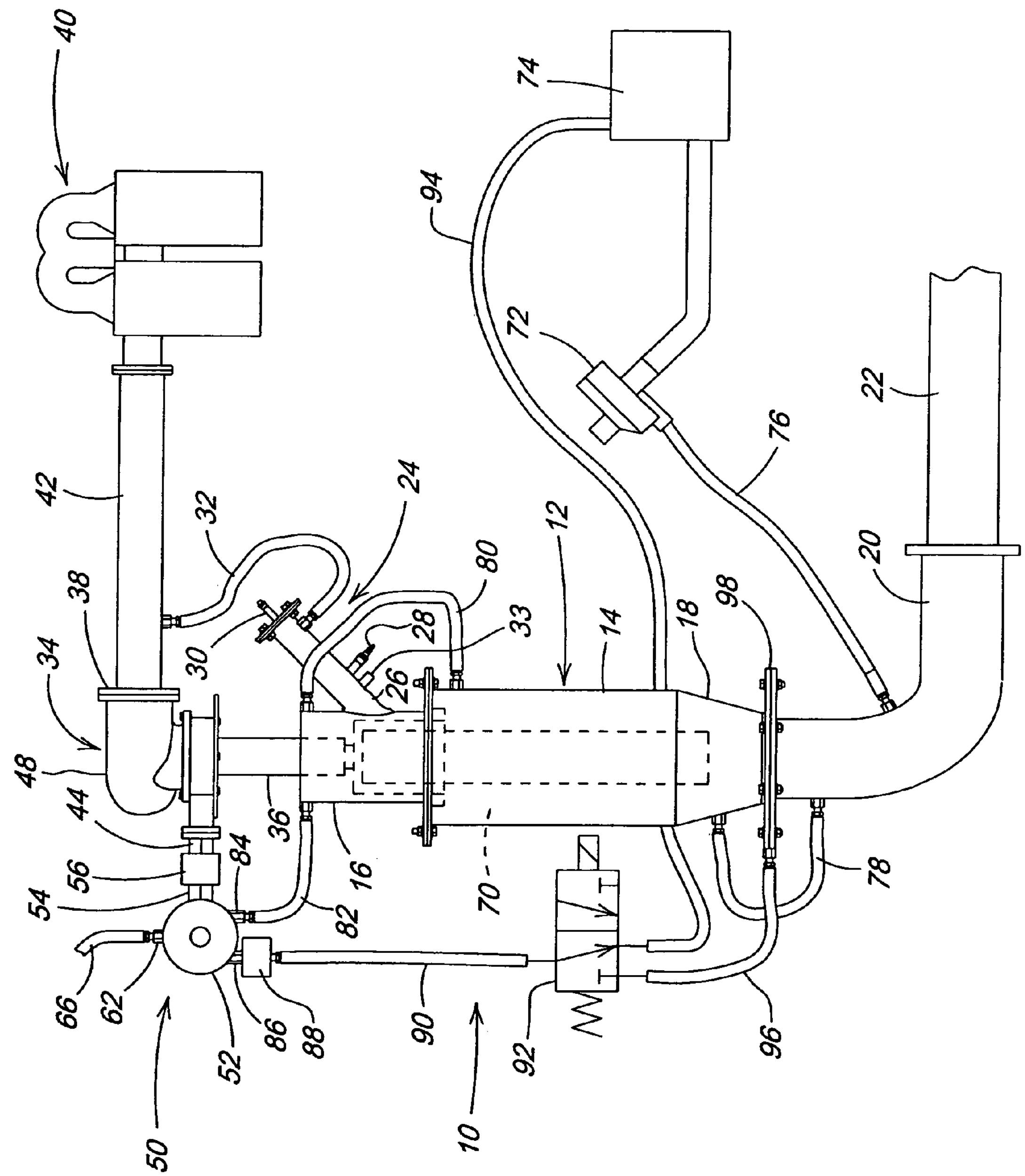
40
74
94
42
72
32
24
76
22
12
80
20
38
30
28
33
14
18
98
34
26
48
44
36
84
56
16
70
54
82
78
66
62
52
86
88
90
92
96
50
10

CROP RE-HYDRATION SYSTEM UTILIZING A DIRECT-FIRED STEAM GENERATOR HAVING CONTINUOUS WATER CIRCULATION

FIELD OF THE INVENTION

The present invention relates to crop re-hydration, and more particularly relates to a direct-fired steam generator particularly designed for use in crop re-hydration.

BACKGROUND OF THE INVENTION

The standard design for a direct-fired steam generator utilizes a once-through water system in which all feed water pumped into the water-jackets of the combustion chamber and adjacent components is injected into the exhaust stream of hot gases at the bottom the combustion chamber where it is changed into steam by the hot gases. This approach has several drawbacks.

A first drawback occurs during the procedure of starting up the steam generator for operation. A water top-up is needed to ensure that the water jackets are completely filled before igniting the main flame. Since the water enters the water jackets under pressure, any excess is injected into the flame chamber. At this time, no hot gases are present to change the water to steam and this injected water is eventually blown through the steam discharge system and deposited on the crop entering the baler. This causes wet spots in the hay, which may ultimately result in spoilage and, thus, in an entire bale being ruined.

A second drawback occurs during shut-down when water is pumped through the cooling jackets to cool the combustion chamber after the main flame has been extinguished. This cooling water causes the same problems as that caused by the top-up water.

A third drawback occurs when the machine is shut down for the day, and water contained in the water jackets boils because the flow of fresh cooling water ceases when the water pump is shut off. This boiling action results in water running into the exit end of the combustion chamber, where its conical end section guides the water into the cylindrical section of the combustion chamber. This presence of water causes a relatively high humidity to exist in the combustion chamber, then, as the baler sits overnight, moisture will condense on the surfaces of associated parts. It has been observed that when water condenses on the pilot flame igniter or on the flame scanner, ignition difficulties arise and the scanner malfunctions.

Thus, the problem to be solved is to provide the necessary water for cooling the steam generator and for producing steam without causing the above-noted problems.

SUMMARY OF THE INVENTION

According to the present invention, there is provided an improved direct-fired steam generator system.

An object of the invention is to provide a direct-fired steam generator system including a water supply arrangement that avoids the problems associated with the prior art water supply arrangement. This object is accomplished by providing a water supply arrangement wherein the water first flows through the various cooling water jackets of the steam generator system and then is routed, by way of a three-way valve, normally to the water supply tank, and selectively to a water injection arrangement for injecting water into the bottom of the combustion chamber. Just before the main flame is ignited, the three-way water valve is shifted from its normal, tank position to its injection position wherein it redirects the water flow from flowing to the storage tanks to flowing to the water injection arrangement. Thus, the three-way valve permits water to be continually circulated through the water jackets ensuring the jackets are always full whether the main flame is present or not. Because the three-way valve normally prevents water in any form from entering the combustion chamber, problems with condensation forming on associated parts is eliminated since a low humidity environment is maintained in the combustion chamber.

BRIEF DESCRIPTION OF THE DRAWINGS

The sole FIGURE is a somewhat schematic, top, partial sectional view of a direct-fired steam generator system embodying the present invention, but omitting most of the fuel supply system, while showing primary components of the air and water supply systems.

DESCRIPTION OF THE PREFERRED EMBODIMENT

Referring now to the drawing, there is shown a direct-fired steam generator assembly 10 including a steam generator body 12 having a cylindrical inlet section 14 to which a cylindrical burner-head 16 is coupled, and having a conical outlet section 18 to which one end of an elbow 20 is coupled, the other end of the elbow 20 being coupled to a static mixer 22. A pilot burner arrangement 24 includes a tube 26 mounted so as to project though and terminate at an interior surface of a lower region of the burner-head 16. An igniter 28, which may be a spark plug or other type of sparking device, is mounted to the tube 26 so as to selectively create a spark at an interior location of the tube 26 for igniting a fuel/air mixture resulting when vaporized fuel enters by way of a pilot fuel inlet 30 provided in a cover at an inlet end of the tube 26 and when air enters by way of a pilot burner air line 32 coupled to an upper location of the tube 26. A flame sensor 33 is located below the igniter 28 so as to detect, and advise an operator of, the presence of a pilot flame in the tube 26 or of a main flame in the burner-head 16, the latter being detected once the pilot flame is extinguished after it is presumed that the main flame is burning.

A carburetor 34 has an outlet coupled to an inlet end of the burner-head 16 by a short tube 36, and has a main combustion air inlet 38 coupled for receiving pressurized air from a variable output blower or air pump 40 by an airline 42. It is noted that the pilot burner air line 32 is coupled to the line 42 just upstream of the carburetor 34. The carburetor 34 also has a main combustion fuel inlet 44 coupled to an outlet end of a throttle body (not shown) having a portion located within a 90° air horn 48.

Although only one of the pair is shown, a fuel converter assembly 50 includes a pair of converter units 52 respectively having a pair of gaseous fuel outlets 54 coupled to a manifold 56, in turn, having an outlet coupled to the fuel inlet 44 of the throttle body. The amount of fuel entering the throttle body is metered by the action of a metering valve, which is actuated in accordance with a pressure drop across a diaphragm of a diaphragm and metering valve assembly (not shown) located within the carburetor 34. Air flow through the carburetor 34 is caused by the introduction of high pressure air at the air inlet 38.

The steam generator body 12 defines an interior combustion or flame chamber 70. The generator body 12, burner-head 16 and elbow 20 are all double-walled so as to define respective water jackets for containing cooling water. Cooling water is supplied by a water pump 72 having an inlet coupled to a water tank 74 and an outlet coupled by a cooling water line 76 to an inlet provided in the outer wall of the elbow 20. The water jacket of the elbow 20 is coupled by a water transfer line 78 to the water jacket of the generator body 12, and the water jacket of the generator body 12 is coupled to the water jacket of the burner-head 16 by a water transfer line 80. A pair of water transfer lines 82 (only one being visible) each have respective inlet ends coupled to the water jacket of the burner-head 16 and respective outlet ends respectively coupled to a pair of water inlets 84, respectively of the converter units 52. Each of the converter units 52 includes a water outlet 86 coupled, as by a T-connection 88 to a water line 90 having its outlet coupled to an inlet port of a three-way water control valve 92.

The water control valve 92 has respective outlet ports coupled to a return line 94, in turn, coupled to the water tank 74, and coupled to a water injector line 96, in turn, coupled to an injector flange arrangement 98 for metering water into the conical outlet section 18 of the steam generator body 12, and, hence, into the combustion chamber 70 so as to be changed to steam by coming into contact with hot combustion gases. The water control valve 92 may take various known forms but is here depicted as a solenoid-operated valve that is spring biased to a normal return position, wherein it connects the water line 90 to the tank 74 by way of the water return line 94. When the solenoid is energized, the water control valve 92 is shifted to an injector position wherein it connects the water line 90 to the injector flange arrangement 98 by way of the injector line 96.

In operation, the water pump 72 will initially be energized to cause water to be pumped from the water tank 74 so as to fill the serially-connected water jackets of the elbow 20, combustion chamber 70 and burner-head 16. Once the water jackets are full, water will flow from the burner-head 16 and be circulated through the fuel converter units 52, and then to the three-way water control valve 92. The solenoid of the water control valve 92 will at this time be de-energized so that the control valve 92 occupies its normal return position connecting the water line 90 to the tank 74 by way of the return line 94. Thus, the valve 92 prevents any of this water from reaching the interior of the combustion chamber 70 prior to ignition.

Next, the fuel system will be activated to supply the pilot burner tube 26 with an appropriate air/fuel mixture, while at the same time the igniter 28 will be activated to supply a spark for igniting the pilot air/fuel mixture. Shortly thereafter, appropriate valves will be activated to turn on the supply of the main combustion air/fuel mixture so that it may be ignited by the pilot flame. Just prior to flame being ignited, the solenoid of the water control valve 92 is activated so as to shift to its injector position wherein it directs the water returning from the converter units 52 to the injector flange arrangement 98. However, the flame sensor 33 will send a signal to negate this activation in the event no flame is sensed when the pilot flame is turned off. If there is a flame, the control valve 92 will direct water to the injector flange arrangement 98, which meters the water into the outlet end of the combustion chamber 70 where it is contacted by the hot combustion gases and changed to steam. Thus, only steam is deposited on the hay being baled and no wet spots causing spoilage occurs.

The operation of the water control valve 92 also results in preventing condensation from forming on parts in communication with the combustion chamber 70. Specifically, when the steam generator assembly 10 is shut down for the day, the solenoid will be deactivated and the valve 92 will again assume its normal return position wherein it directs water to the tank 74 by way of the return line 94. Thus, any water which boils in the steam jackets, once the flow of cooling water ceases due to the pump 72 being shut off, will not end up in the combustion chamber 70. Therefore, water is not present to raise the humidity inside the combustion chamber 70 and the environment inside the combustion chamber will remain too dry for any condensation to occur on parts as they cool down over night. Problems with wet igniters and flame sensors, for example, are thus avoided.

Having described the preferred embodiment, it will become apparent that various modifications can be made without departing from the scope of the invention as defined in the accompanying claims.

ASSIGNMENT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

What is claimed is:

1. In a direct-fired steam generator assembly including a steam generator body having a water jacket surrounding a combustion chamber, said combustion chamber having an inlet end for receiving a combustible fuel/air mixture for being ignited in said combustion chamber, said combustion chamber having an outlet for discharging hot combustion gases, a water injector coupled to said steam generator body and being located for metering water into said outlet end of the combustion chamber, a water pump coupled to the reservoir and to said water jacket for continuously supplying said water jacket with water, and a water return line arrangement coupled to said water jacket, the improvement comprising: a water control valve having an inlet coupled to said return line arrangement and having first and second outlets; a return water line coupled between said first outlet and said reservoir; an injector water line coupled between said second outlet and said water injector; and said water control valve being selectively operable to couple said return water line arrangement either to said reservoir or to said water injector.

2. The direct-fired steam generator assembly, as defined in claim 1, wherein said water control valve is normally positioned in a return position wherein it couples said return water line arrangement to said reservoir; and is operated to an injector position, wherein it couples said return water line arrangement to said injector, only when a flame is present, or very close to being present in, said combustion chamber.

3. A direct-fired steam generator assembly, comprising: a steam generator body having a double wall surrounding and defining a combustion chamber having an inlet end and an outlet end; a water injector assembly being mounted to said generator body for metering water into said outlet end of said combustion chamber; a cooling water tank; a water pump having an inlet coupled to said reservoir and an outlet coupled to a water jacket; a water control valve; a water line arrangement having an inlet arrangement coupled to said water jacket and an outlet coupled to said return water control valve; an injector line being coupled between said water control valve and said water injector assembly; a tank return line being coupled between water control valve and said tank; and said water control valve being selectively operable between a return position wherein said water line arrangement is coupled to said tank by way of said return line, and an injector position, wherein said return water line arrangement is coupled to said water injector assembly by way of said injector line.

* * * * *